United States Patent [19]

Fagan et al.

[11] 3,828,125

[45] Aug. 6, 1974

[54] TELEVISION SYSTEMS

[75] Inventors: Donald Frederick Fagan, Flackwell Heath; Rodney Barker Hale, St. Albans, both of England

[73] Assignee: Movalarm Limited, Iver, Buckinghamshire, England

[22] Filed: Nov. 16, 1972

[21] Appl. No.: 307,068

[30] Foreign Application Priority Data

Nov. 16, 1971 Great Britain .................... 53251/71

[52] U.S. Cl....... 178/6.8, 178/DIG. 33, 178/DIG. 38

[51] Int. Cl. ............................................. H04n 7/18

[58] Field of Search........ 178/6.8, DIG. 33, DIG. 38

[56] References Cited

UNITED STATES PATENTS 3,686,434 8/1972 Lemelson..................... 178/DIG. 38

*Primary Examiner*—Howard W. Britton

*Attorney, Agent, or Firm*—Brisebois & Kruger

[57] ABSTRACT

A television system is provided for the surveillance of premises or areas to be kept under watch, as a security precaution against intruders, etc. The system operates to provide an indication or alarm upon movement occuring in the area under surveillance. More specifically the system includes a television camera for viewing a normally static scene and means for detecting a change in the camera output video signal caused by a change in the scene, together with means responsive to the detected change for operating an alarm device or switching a television monitor to reproduce the camera output video signal.

5 Claims, 3 Drawing Figures

Figure 2:
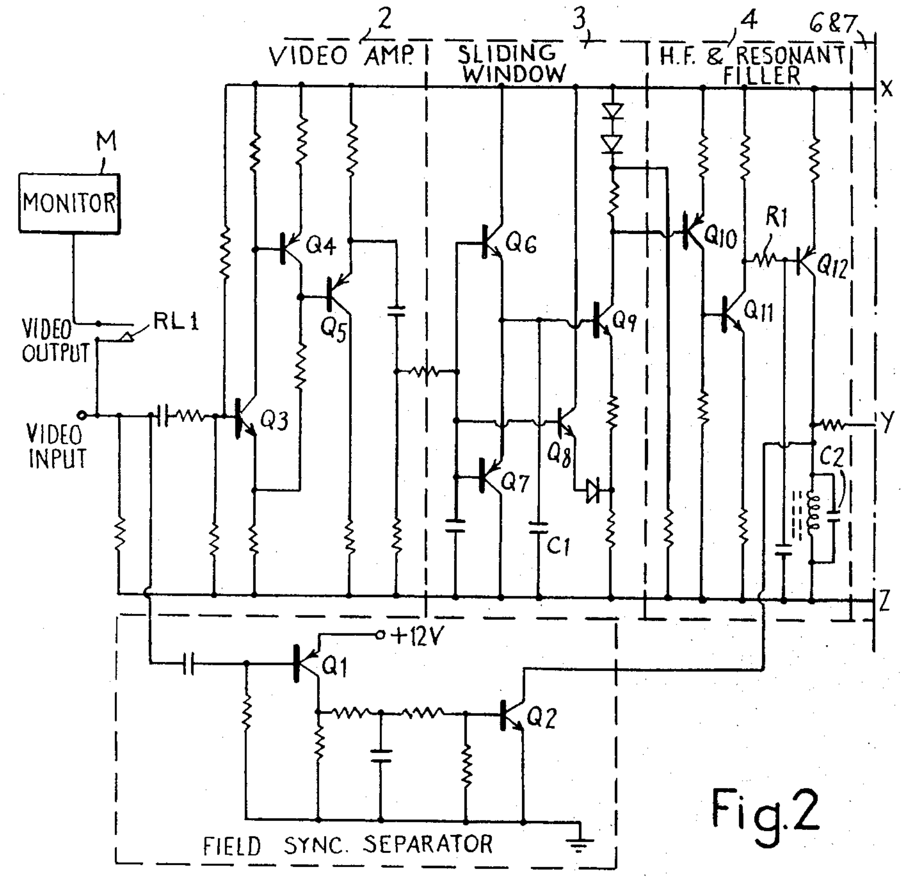

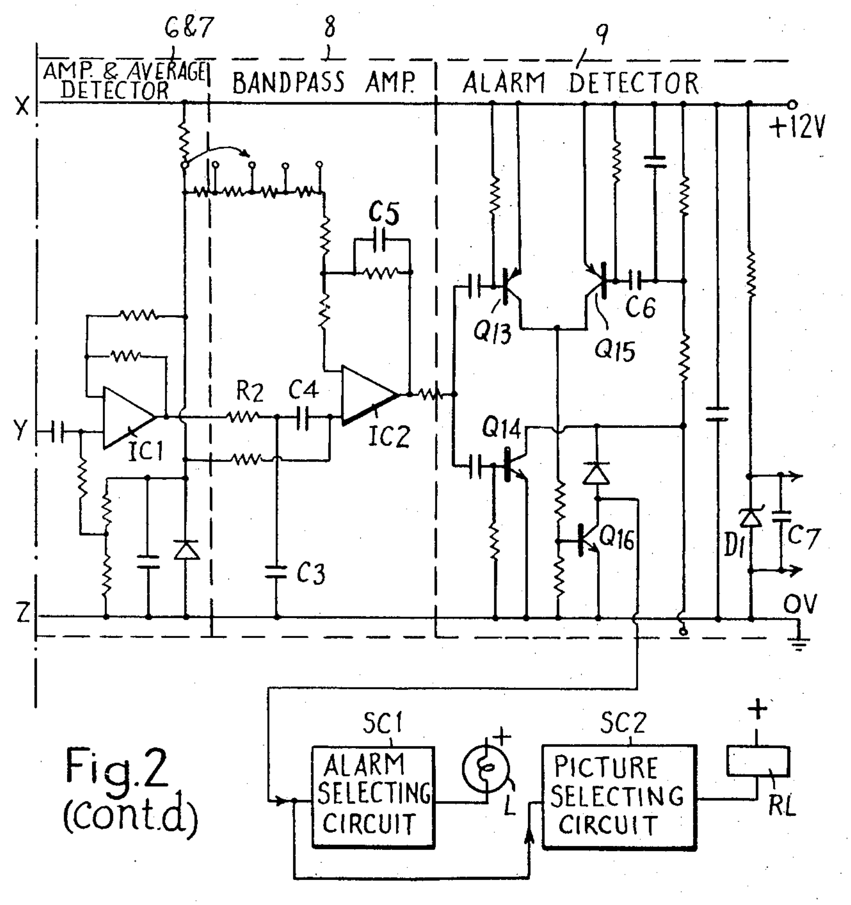
Fig.2 (cont.d)

TELEVISION SYSTEMS

The present invention relates to television systems and more particularly to such systems which are employed for surveillance of a part of a building or other area as a security precaution against intruders or for other safety purposes e.g. fire detection. Such systems are generally required to survey a normally unchanging scene, since they are usually employed when the area to be watched is unattended, and therefore an unchanging television picture is reproduced on a television monitor of the system, except when an abnormal condition, e.g. entry of an intruder or the break-out of fire occurs. In practice it is virtually impossible for a person, such as a watchman or security guard, viewing the television monitor to maintain a constant watch on the television picture so that periods inevitably occur when an intruder can enter the area under surveillance without being detected.

It is an object of the present invention to provide a television system for security purposes wherein constant watching of a television monitor is not required.

From one aspect the invention provides a system including a television camera for viewing a static scene wherein means are provided for detecting a change in the scene and for operating an indicator or alarm device in response to said change.

From another aspect the invention provides a television system including a television camera, at least one picture producing device for reproducing an image of a static scene viewed by the television camera, means for detecting a change in the camera output video signal caused by a change in the scene and means responsive to said detected change for operating an alarm or indicator device.

The television system may in many cases be a closed circuit system, but the invention is also applicable to a television system wherein the output video signals from a television camera are transmitted through the atmosphere or space to a remote point at which the picture reproducing device and/or alarm or indicator device is located.

The system may include a plurality of television cameras each viewing a different area and whose outputs are connected in turn to be reproduced by a common monitor device. Also, a plurality of monitors may be provided at different locations.

According to a feature of the invention the output video signal from a television camera is fed to a filter for removing information at the line repetition rate and the output of said filter is applied to a further resonant filter having a resonant frequency which is higher than the field repetition rate and which serves to reject large areas of uniform brightness in the static scene which is being viewed and also to reject fine detail from the transitions between brighter and darker areas, or vice versa, of the scene under surveillance whereby only transitions from reasonably large objects will produce an output from the resonant filter. The output from the resonant filter is applied to an average detector producing a unidirectional voltage which is employed to operate an indicator or alarm device.

Advantageously the output from the detector is applied through a capacitively coupled amplifier with a limited bandwidth so that very slow changes in the overall brightness of the picture and also very fast changes in the picture will be rejected and will not operate the indicator or alarm device.

Figure 1:
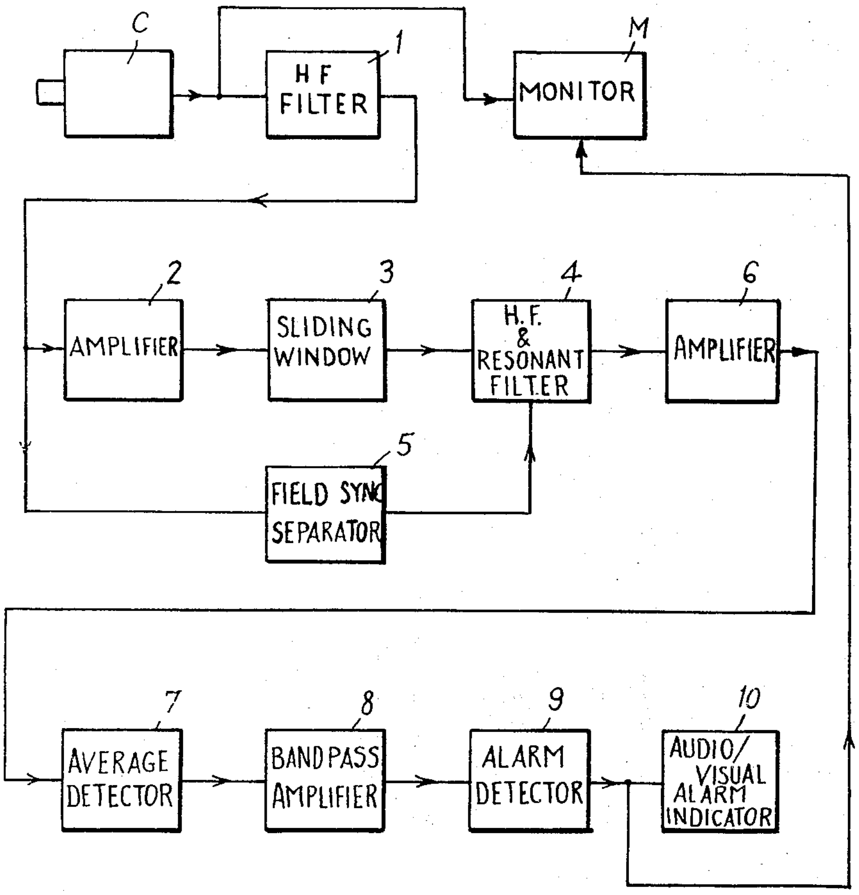

The invention will now be further described, by way of example, with reference to the accompanying drawings, in which:

FIG. 1 is a block diagram of one embodiment of a simple closed circuit television surveillance and alarm system according to the invention, and FIG. 2 is a circuit diagram of the system of FIG. 1.

The system to be described is intended for keeping a constant watch on an area in a building, for example a warehouse, laboratory, public building or aircraft hanger, when the area is not occupied e.g. at night or at weekends, and when only a static scene should be available for surveillance by a television camera.

Changes in the static television picture reproduced which are readily visible to the eye can arise from relatively minor changes in the video waveform from the television camera and in order to obtain adequate sensitivity to picture disturbances of the type envisaged, e.g. such as would be caused by the entry of an intruder or the break-out of fire, requires the necessity to reject as much redundant video information as possible so that the disturbances appear to be of relatively greater magnitude in the signal output and are therefore easier to detect.

Referring to FIG. 1, the video output signal from a television camera C is firstly fed to a high frequency filter 1 in order to remove all the information at line repetition rate from the video signal. This line information can readily be discarded since for an average static scene the video signal is repetitive at field rate only and it is only changes in the repetitive nature of the signal which are require. The output from the filter 1 is fed through an amplifier 2 to a "sliding window" amplifier 3. A "window amplifier" is known in the electronic art as one which accepts only a limited part of the total input signal. The sliding window amplifier accepts only a limited part of the input signal, but "slides up" to accept small variations in bright areas and "slides down" to accept small variations in dark areas. This tends to equalise the sensitivity in bright and dark areas and also compensates for overall changes in illumination such as inevitably occur with fluctuations in the lighting sources and power supply. The sliding window amplifier 3 feeds a resonant filter 4 which is designed to reject two further aspects of the video signal. Firstly, the filter 4 rejects large areas of uniform brightness so that they give no output from this filter and it is only the transition from brighter to darker areas and vice versa, i.e. "edges" between different tones, which give rise to an output. The resonant frequency of the filter is made to be a multiple, which need not be a whole multiple, of the field repetition rate, e.g. from five to 10 times the field repetition rate, whereby fine detail from such transistions is rejected and only transitions from reasonably large objects will give rise to an output. The field synchronising separator circuit 5 feeding the resonant filter 4 serves to eliminate large signals caused by the field blanking at the commencement of each field, which can otherwise obscure wanted variations.

The output from the resonant filter 4 is fed through a further amplifier 6 whose output feeds an average detector 7. The output from this detector is a D.C. voltage and any picture disturbance of the kind to be detected gives rise to fluctuations of this voltage. This D.C. voltage is fed through a capacitively coupled band-pass amplifier 8 of limited bandwidth so that both very slow changes arising from drift of the television camera or slow changes in the ambient light of the area being watched, e.g. changes between night and day or between cloudy or sunny conditions are eliminated. This amplifier also eliminates very fast changes such as may be caused by a bird flying through the area under surveillance. Thus, only intermediate changes are passed to the alarm detector 9 which is arranged so that voltage excursions of either polarity will operate a switching device e.g. a transistor, and thereby initiate the alarm and/or indicating device 10. This device may be either a visual or aural device, or both. The output from the alarm detector can also be employed to control one or more picture monitors M fed with the video signal from the camera C.

Referring now to FIG. 2, the video input from the camera C is fed via the H.F. filter 1 to the video amplifier 2 comprising transistors Q3 and Q4 arranged as a feedback amplifier with an emitter follower output Q5. This provides an average video signal of the order of 5 volts peak to peak, excluding synchronising pulses, to operate the sliding window amplifier 3 consisting of transistors Q6 to Q9.

Transistors Q6 and Q7 are complementary emitter followers sharing a common capacitor load C1. The voltage on this capacitor follows the input variations, except for the times when the input reverses direction, and both Q6 and Q7 are cut off by virtue of their emitters being held at a constant potential by C1. The input level has to traverse the combined emitter-base voltage drops before either transistor becomes an active emitter follower. This in turn gives rise to a 'dead-band' of about 1 volt loss on the original signal when measured at C1, and this dead-band slides up and down in level following the input level. It is this lost signal which is then recovered by a difference amplifier comprising transistor Q9. The base of Q9 is fed from C1 whilst the emitter is driven with the original signal via the emitter follower transistor Q8. The difference signal appears at the collector of Q9 and consists of about 1 volt of video signal, comprising the signal changes both from the dark and light areas of the scene being televised, without precedence being given to the normally much greater variations which are possible in the brightly lit areas of the scene. This circuit also reduces the effect of lighting variations, such as arise from irregularities in the mains supply.

The signal from Q9 is amplified by transistors Q10 and Q11, and is filtered by a simple H.F. filter consisting of R1, C2 and fed to a resonant inductor from transistor Q12. The resonant frequency is about ten times field rate and is chosen to respond to video information from objects in the scene of reasonable size but to ignore large evenly illuminated areas apart from transients arising from the edges of such areas.

Since the video signal contains field blanking, a simple field synchronising separator circuit comprising transistors Q1 and Q2 is provided which, by causing Q2 to briefly short circuit the resonant circuit during and just after field blanking, eliminates the very large disturbance which would otherwise occur from the field blanking waveform.

The oscillations generated in the resonant circuit are amplified by integrated circuit IC 1, which is biassed so that the output D.C. level in the absence of a signal is near ground (negative potential) and thus the amplified oscillations can only traverse in the positive direction. An integrating capacitor C3 with resistor R2 provides an average D.C. level corresponding to the magnitude of the positive excursions of IC 1. C4 and C5 with integrated circuit IC 2 form a bandpass filter and amplifier so that changes of either polarity which lie in the very approximate time range of 0.25 – 10 seconds trip the alarm detector comprising transistors Q13 to Q16. Very fast changes and very slow changes of voltage will not affect the alarm circuit.

Excursions of either polarity from IC2 are fed to Q13 and Q14 which respectively turn on with negative and positive excursions. An output from Q14 causes Q15 to conduct via capacitor C6. This in turn switches on Q16 which is maintained on by positive feedback round the loop for the time constant of the circuit. Similarly an output from Q13 switches on Q16 to intiate the same manner of operation. Zener diode D1 and capacitor C7 provide the power supply for the integrated circuits.

The alarm output signal from transistor Q16 is fed to the alarm selecting circuit SC1 to cause operation of an indicator lamp L, either continuously or intermittently. The alarm output signal is also applied to the picture selecting circuit SC2 which operates relay RL to close contacts RL1 connected to the video input of the circuit and thereby apply the video signal to the picture monitor M. This monitor then provides a picture of the surveyed area in which the disturbance occured which gave rise to the alarm conditions.

The circuits SC1 and SC2 may comprise bistable circuits whose state is switched by the alarm output signal and which can be reset manually or by logic control circuits.

It will be appreciated that in a system where the video signals from a plurality of television cameras, each viewing a different area, are selectively switched to a common monitor device, an alarm condition produced in any one video channel may be employed automatically to switch that channel to the monitor for instant viewing by a person keeping watch.

It will thus be seen that the present invention provides a television surveillance system which provides an effective warning against intruders, fire or other hazards without relying on the efficiency or alertness of a watchman or security guard. The efficiency of the watchman or security guard is also increase since he is not required to undergo the continuous strain and fatigue induced by continuously keeping watch on a static television picture.

If desired, in practice, the provision of a television monitor can be dispensed with and the output video signal from the television camera can be processed as above described and solely employed to operate an indicator or alarm device.

The system may also include a video recorder which becomes operative when the indicator or alarm device is operated and which then serves to record the scene viewed by the television camera; thereby providing a permanent record of the conditions in the area under surveillance which caused the operation of the alarm.

Moreover in addition to a television camera, the output circuit of another type of alarm generator device, such as an infra red beam generator which is interrupted by an intruder, may also be connected into the alarm circuit for the purpose of switching a particular television camera output to the television monitor, as well as causing an alarm to sound. This would be used, for instance, when poor lighting conditions do not allow an acceptable television picture to be obtained, and in such an instance the infra red alarm circuit can be made to switch in an electrical contactor which will bring on sufficient lighting to illuminate the scene to produce an acceptable television picture.

Furthermore, a television camera may be fitted with a remotely controlled pan and tilt and a zoom lens which, following the interruption of the external alarm device could be made to bring an intruder into close-up.

We claim:

1. A television system including a television camera, at least one picture reproducing device for reproducing an image of a static scene viewed by the television camera, means for detecting a change in the camera output video signal caused by a change in the scene and means responsive to said detected change for operating an alarm or indicator device wherein said means for detecting a change in the camera output video signal comprises means for feeding the output video signal from the television camera to a filter for removing information at the line repetition rate and means for applying the output of said filter to a further resonant filter having a resonant frequency which is higher than the field repetition rate and which serves to reject large areas of uniform brightness in the static scene which is being viewed and also to reject fine detail from the transitions between brighter and darker areas, or vice versa, of the scene under surveillance whereby only transitions from reasonably large objects will produce an output from the resonant filter.

2. A system as claimed in claim 1, including a sliding window circuit to assist in equalising the sensitivity in bright and dark areas of the scene under surveillance and compensate for overall changes in brightness.

3. A system as claimed in claim 1, including a field synchronising separator circuit for eliminating large signals caused by the field blanking at the commencement of each field.

4. A system as claimed in claim 1, wherein the output from the resonant filter is applied to an average detector producing a unidirectional voltage which is employed to operate an indicator or alarm device.

5. A system as claimed in claim 4, wherein the output from the detector is applied through a capacitively coupled amplifier with a limited bandwidth so that very slow changes in the overall brightness of the picture and also very fast changes in the picture will be rejected and will not operate the indicator or alarm device.

* * * * *